United States Patent [19]

Breidohr et al.

[11] Patent Number: 5,779,815
[45] Date of Patent: Jul. 14, 1998

[54] PROCESS FOR REMOVAL OF LUMEN FILLERS AND OTHER SOLUBLE RESIDUES FROM HOLLOW FILAMENTS

[75] Inventors: Hans-Günter Breidohr; Manfred Martin, both of Wuppertal; Bernhard Krautwurst, Erlangen; Martin König, Düsseldorf, all of Germany

[73] Assignee: Akzo Nobel NV, Arnhem, Netherlands

[21] Appl. No.: 602,820

[22] PCT Filed: Jun. 3, 1995

[86] PCT No.: PCT/EP95/02118

§ 371 Date: Feb. 26, 1996

§ 102(e) Date: Feb. 26, 1996

[87] PCT Pub. No.: WO96/01144

PCT Pub. Date: Jan. 18, 1996

[30] Foreign Application Priority Data

Jul. 4, 1994 [DE] Germany ............ 44 23 167.9

[51] Int. Cl.⁶ ...................................... B08B 9/00
[52] U.S. Cl. .................. 134/22.1; 134/21; 134/23; 134/30; 134/33; 134/37; 134/40; 210/500.23; 210/321.8; 210/634; 264/41

[58] Field of Search ............... 134/21, 22.1, 23, 134/30, 33, 40, 37; 210/500.23, 321.8, 634; 264/41

[56] References Cited

U.S. PATENT DOCUMENTS 4,263,053  4/1981  McKinnon, Jr. ............ 134/21
5,470,474  11/1995  Ansorge et al. ............ 210/500.23

*Primary Examiner*—Laurie Scheiner
*Attorney, Agent, or Firm*—Joseph M. Noto; Louis A. Morris

[57] ABSTRACT

A process and an apparatus for removal of a lumen filler and/or other soluble residues from hollow filament bundles are described. The hollow filament bundles are first roughly cleaned by centrifuging, after which in a process preferably containing multiple steps they are cleaned by spraying and centrifuging. The first spraying step is preferably carried out in a pass-through mode and each of the additional steps under recirculation. After a constant concentration has been attained, the cleaning baths in each case are employed for a lower-order treatment step, the cleaning bath of the first spraying step being fed to a recycling process.

12 Claims, 3 Drawing Sheets

PROCESS FOR REMOVAL OF LUMEN FILLERS AND OTHER SOLUBLE RESIDUES FROM HOLLOW FILAMENTS

DESCRIPTION

The invention relates to the removal of a lumen filler and/or other soluble residues from hollow filaments.

The production of hollow filaments, especially of hollow filament membranes, from various organic and synthetic polymers is well known. During the extrusion of the spinning solution necessary for the production of hollow filaments, a liquid (lumen filler) is generally extruded into the spinning solution which is expressed from a ring spinneret, in order to guarantee the lumen (cavity) in the hollow filament. Only liquids which do not modify the polymer of the hollow filament or react with the means necessary for the production of the hollow filament are suited for the lumen filler.

For instance in the production of cellulosic hollow filament membranes isopropyl myristate is used as a lumen filler. This lumen filler can be removed from the membrane using chlorofluorocarbons (CFCs), but the problem arises in this case that the cleaning agent as well must then be completely removed from the membrane, for instance by flushing with a gas. In addition the usage of CFCs should be avoided if possible because of the very negative environmental impact.

For other polymers as well, such as polyamides, polyacrylonitrile or poly(ether sulfone), specific lumen fillers are necessary, which can only be removed from the membrane by means of specific solvents. Likewise in this case, solvents must frequently be employed which pose a considerable burden on the environment, and/or their removal requires a great deal of effort.

Various processes are known for removing lumen fillers from hollow filaments. For instance, highly volatile lumen fillers are used for the production of hollow filaments and can easily be removed from the hollow filaments by means of gassing under pressure. However up to now, a highly volatile lumen filler has not been found for the production of cellulosic hollow filaments. In the case too of other hollow filaments where higher-boiling lumen fillers must be employed, a direct removal of the lumen filler by means of gas (if necessary under the influence of heat) is not possible at all or only with a very high expenditure of time.

An apparatus for removal of lumen fillers from hollow filaments has been disclosed by DD-A-224 343, whereby hollow filament bundles are situated radially in a centrifuge in order to first spin out most of the lumen filler. Then the drain end of the hollow filament bundles is closed and the hollow filament bundles are flooded with solvent in such a way that they are completely submerged in the solvent. The solvent, which contains lumen filler, is then spun out (rough cleaning). Then a fine cleaning is carried out by constantly feeding new solvent and spinning it off. Subsequently the solvent is evaporated by means of a gas while the centrifuge continues to operate. The described operating process using the known apparatus requires considerable amounts of solvent and flushing gas, so that this process must therefore be described as uneconomical.

In addition, DD-A-219 804 describes a process for removal of lumen fillers from hollow filaments whereby the lumen filler is first roughly removed, the bundles are cleaned in two steps by means of end flooding with a flushing agent which is a solvent for the lumen filler, and the solvent is subsequently removed by means of a gas. This process is used for rolled-up hollow filament mats. Huge amounts of solvent and gas are also consumed in this case.

The two latter processes must therefore also be described as uneconomical because considerable energy is necessary to recover the lumen filler, the solvent and the gas from the considerable quantities of solvent and gas which emerge from the centrifuge. The problem upon which the present invention is based consists in providing a process for removal of a lumen filler and/or other soluble residues from hollow filaments, whereby the lumen filler is first roughly removed through centrifuging, the bundles are cleaned with a solvent by end feeding of flushing agent and centrifuging, and the solvent is then removed by means of a gas.

This process should minimize environmentally detrimental influences and permit economical usage of solvent and gas. This problem is solved by the invention in that hollow filaments of finite length are combined into bundles and in that the cleaning with solvent is carried out by end spraying of the hollow filament bundles. Preferably, the spraying is carried out in at least three steps, whereby the first step is carried out in a pass-through mode and the spraying in the further steps is carried out in a recirculation process. It is advantageous to collect the solvent containing lumen filler and/or soluble residues from each step separately, whereby the solvent of the first step is then fed to the recovery process and the solvents of the further steps are used for spraying in a lower-order step.

According to the present invention, end spraying means any end application of solvent with simultaneous centrifuging which results in the solvent, due to the centrifugal force, flowing through the entire cross-section of the bundle in such a way that the solvent streams along the outside of the hollow filaments as well as through the inside of the hollow filaments without significant obstruction. For this, the bundles are arranged in the direction in which the centrifugal force acts, which means in such a way that the longitudinal axis of the bundles is arranged at least substantially radially toward the outside in the centrifuge chamber.

Due to the fact that by further removing lumen filler the solvent of a previously executed higher-order step, already containing lumen filler, is re-used, considerable amounts of solvents can be saved.

The process of the invention is quite effective if the spraying of the hollow filament bundles is carried out in up to eight steps, whereby after the first step spraying is conducted under recirculation in such a way that the solvent applied is collected after the pass through the bundles and is again fed to the bundles from the end until the content of lumen filler and/or soluble residues in the solvent remains at least approximately constant. As a consequence effective control of the residual content of lumen filler in the hollow filament is assured in each step.

In order to guarantee a constantly low content of lumen filler in the hollow filament that is significantly below the maximum admissible content, a process is particularly preferred whereby the last step as well is carried out under recirculation. In this case it has been found especially effective if the last step starts with a flushing agent with as low a content of lumen filler or soluble residues as possible, for example 20 ppm at the highest and preferably no more than 5 ppm. The content of the highest-order and last step of the end spraying enables an exact determination of the residual content of lumen filler in the hollow filament.

It is advantageous to conduct the last cleaning step in such a way that the constant concentration of lumen filler or soluble residues which develops under recirculation is as low as possible, since this concentration is likewise a measure for the purity of the final membrane. It is advantageous if this concentration does not exceed 300–400, and preferably does not exceed 250 or 200 ppm, respectively. In case the concentration which results does not adhere to the required quality standards, it may be necessary for instance to conduct one or more additional subsequent spraying steps or to increase the amount of cleaning agent per step.

After completion of a cleaning step between the individual spraying steps, it is advantageous to continue the centrifuging for a time without feeding of cleaning agent, in order to spin off as much liquid as possible.

In the process of the invention the lumen filler and the solvent can be recovered to a large extent from the solvent collected from the first step, which has a high content of lumen filler, and they can be re-used with appropriate purity grades.

The process of the invention has been found most effective if solvent 0.3 to 10 times, preferably 0.6 to 5 times, the hollow filament volume is employed for the individual steps. This volume corresponds to the total amount of flushing agent which is employed for a complete cleaning.

The process of the invention will be explained in detail with reference to the following figures and examples, whereby FIG. 1 shows schematically the process of the invention with 4 spraying steps.

Figure 1:
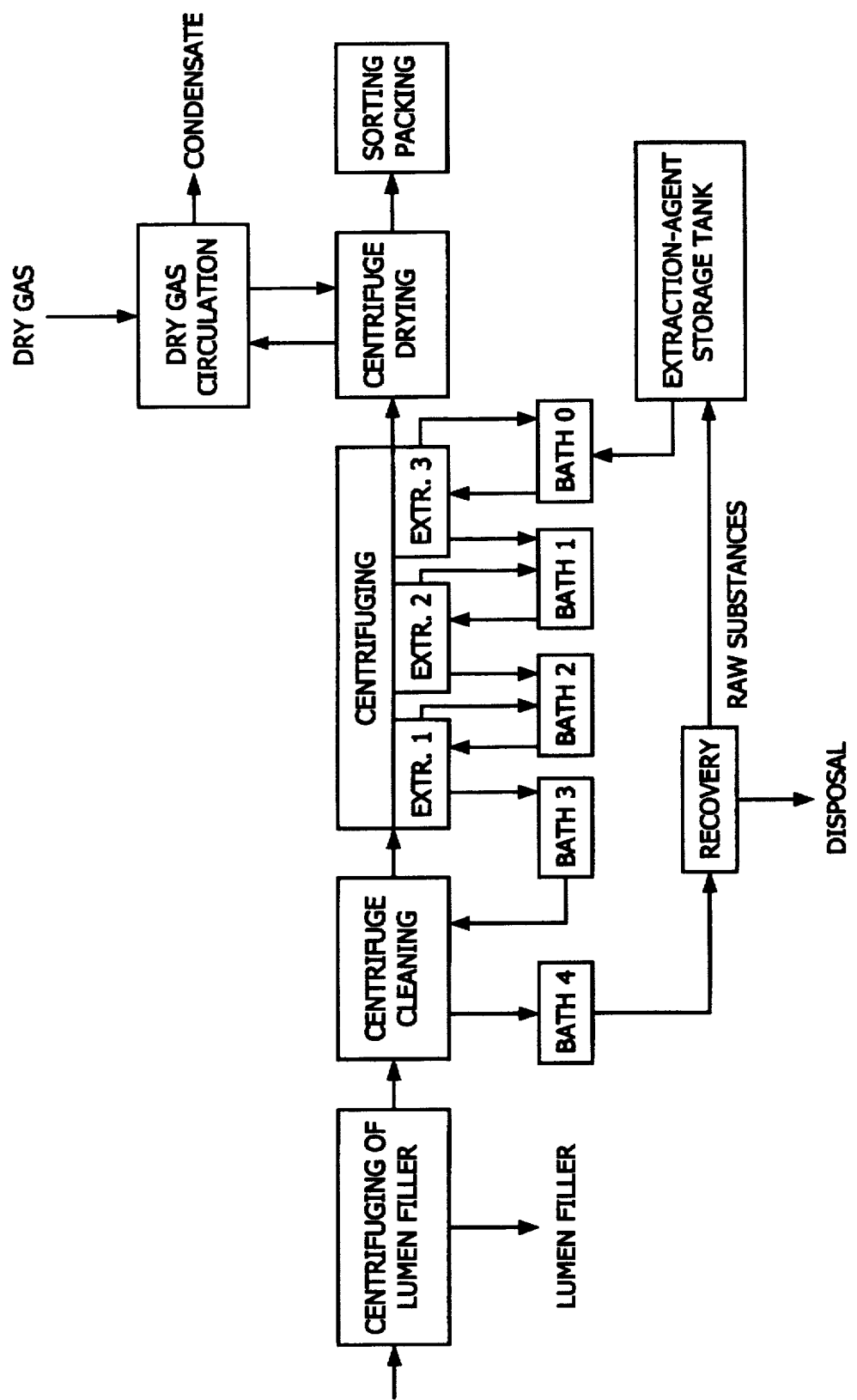

FIG. 1 schematically shows the sequence of the process of the invention with 4 spraying steps. First, the hollow filament bundles are centrifuged (centrifuging of lumen filler), whereby most of the lumen filler is removed. In the first cleaning step (centrifuge cleaning) bath 3 sprays solvent, which already contains lumen filler, at the ends of the hollow filament bundles, and this solvent is released into bath 4. Then the solvent from bath 2 is employed for spraying to further remove the lumen filler, and recirculation occurs between extr. 1 and bath 2.

After completion of this second step the solvent from bath 2 is drained off into bath 3. In the third step (extr. 2) solvent from bath 1 is employed, under recirculation between extr. 2 and bath 1. After completion of the third step the solvent from bath 1 is drained off into bath 2. In the fourth step the final cleaning is carried out from bath 0, which was previously filled with pure or recovered solvent from the storage tank, under recirculation between extr. 3 and bath 0. To obtain the desired final purity in the hollow filaments, one may in this step, if necessary, add solvent from the storage tank or conduct the process again with fresh solvent under recirculation, if the content of lumen filler in the solvent exceeds a preset value, for instance 400 ppm. After completion of the final cleaning, the fourth step, the solvent from bath 0 is drained off into bath 1. Bath 0 can be filled again for the next cleaning procedure. After the fourth step dry gas is fed into the ends of the bundles and through these bundles, whereby recirculation (between dry gas circulation and centrifuge drying) can be conducted. The solvent is hereby evaporated. The cleaned and dried bundles are then forwarded for sorting and packing. Solvent is condensed out from the dry gas. The solvent from bath 4 is fed to the recovery process, and the recovered solvent is fed to the extraction-agent storage tank. The recovered lumen filler can now be used for the production of new hollow filaments. The lumen filler obtained during centrifuging is also recycled (not depicted) and can then be employed again in the production of hollow filaments.

Figure 2:
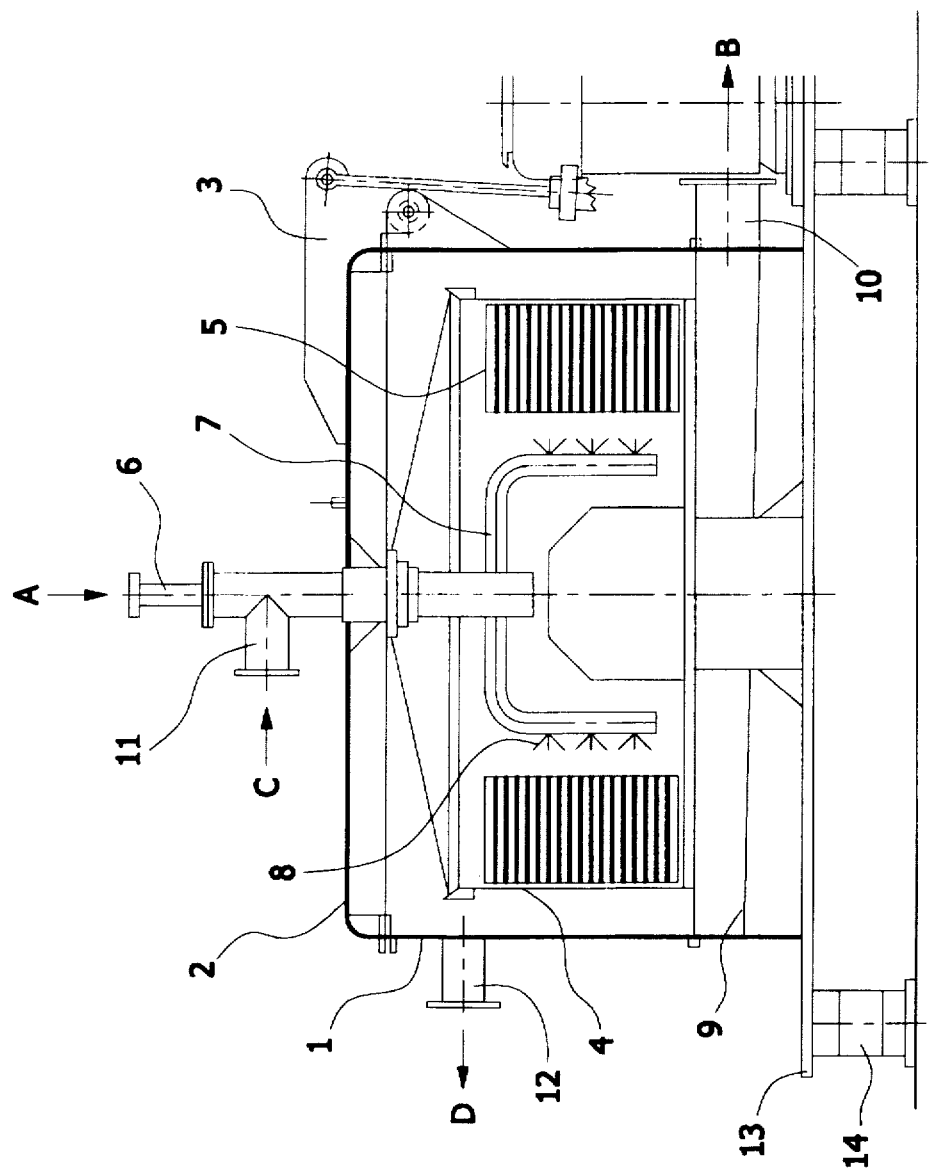
FIG. 2 shows the cross-section through a centrifuge.
Figure 3:
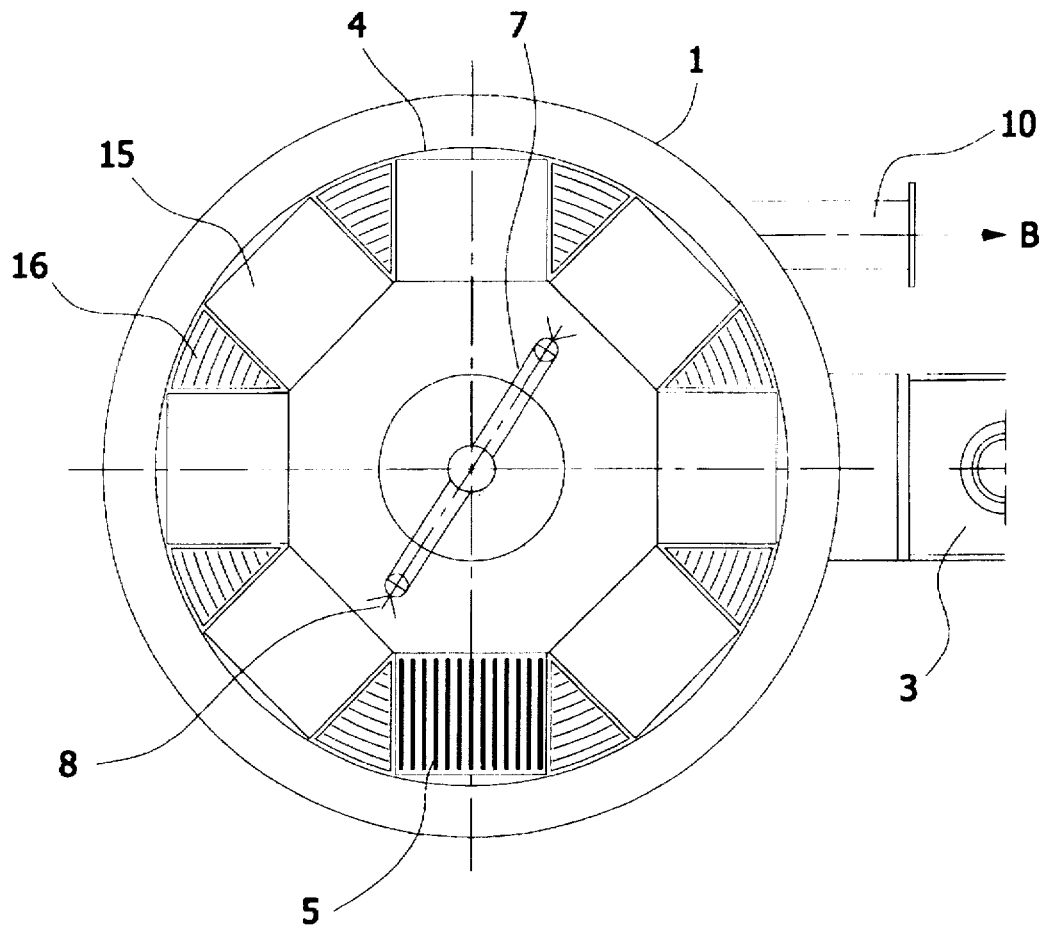
FIG. 3 shows a plan view of the centrifuge of FIG. 3 without cover.

FIG. 2 depicts in cross-section a centrifuge which is suited for carrying out the process of the invention, and FIG. 3 depicts the centrifuge in a plan view. 1 designates the external wall of the centrifuge and 2 the cover of the centrifuge. The cover of the centrifuge can be opened or closed by means 3. These means are not explained here in detail. In the extractor basket 4 hollow filament bundles 5 are inserted radially as depicted particularly clearly in FIG. 3. For this purpose, receptacles 15 are provided in the extractor basket 4, which are secured by spacers 16. Via the flange 6 in the direction of arrow A solvent can be fed to the distributor 7, whereby spray nozzles 8 ensure even end spraying of the hollow filament bundles 5. Due to the centrifugal force of the extractor basket, which is turning at high speed, the solvent is driven to the outside through the hollow filament bundles, namely between the hollow filaments and through the lumen of the hollow filaments, where it is caught by wall 1 of the centrifuge, fed via the inclined bottom 9 of the centrifuge to drain 10 and then drained in the direction of arrow B. In the drying step (evaporation of the remaining solvent) the dry gas is fed via pipe 11 in the direction of arrow C and withdrawn via pipe 12 in the direction of arrow D. As is generally customary, the centrifuge is attached to the base 13, which is mounted on vibration absorbers 14.

Figure 4:
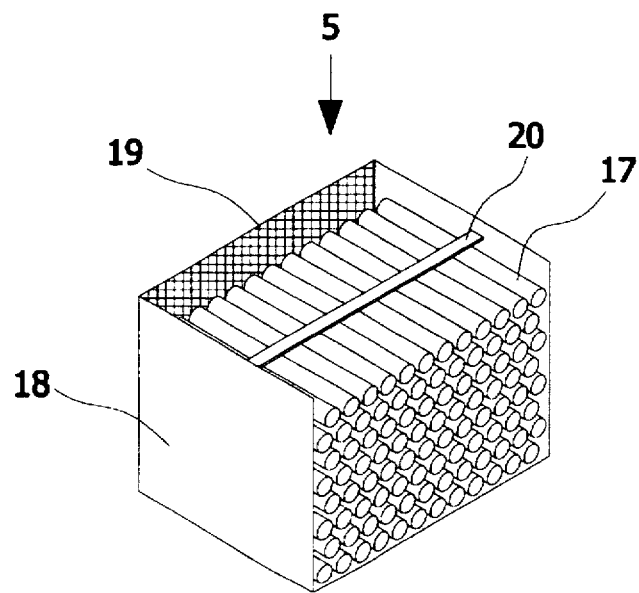
FIG. 4 shows a hollow filament bundle container for use in the centrifuge.

Containers 18 as depicted in FIG. 4 are suited for inserting the hollow filament bundles 5. Container 18 consists of a U-shaped metal sheet, one face of the "U" being closed off by screen plate 19. Hollow filaments 17 are inserted into the U-shaped container 18 in such a way that one of their ends is flush against screen plate 19. After inserting the hollow filament bundles, they are held in place by one or more bar(s) 20 in the U-shaped container.

EXAMPLES 13 000 hollow filaments of 178 mm length are combined into bundles. The hollow filaments had a lumen (inner diameter) of 200 μm. 150 hollow filament bundles were inserted in each of 8 U-shaped containers, and these 8 containers were inserted in a centrifuge in such a way that all hollow filaments and therefore also the hollow filament bundles were oriented radially in the centrifuge. The total length of all hollow filaments inserted in the centrifuge amounted to approximately 2800 km. The hollow filaments were cellulosic hollow filament membranes, which contained isopropyl myristate (IPM) as a lumen filler. Isopropyl alcohol (IPA) was employed as solvent. Solvent mixtures such as IPA/glycerine/water may also be used.

After inserting all U-shaped containers the centrifuge was closed and the lumen filler was spun off. After this, the hollow filament bundles only contained approximately 1270 g IPM. Subsequently, the remaining lumen filler was then removed using a varying number of steps, whereby in each case the first step was conducted in a pass-through mode and the following steps under recirculation. The following table illustrates the consumption of solvent (IPA) when the cleaning is carried out in 1, 2, 3, 4 or 5 steps.

In case pure isopropyl alcohol is used as a flushing agent, it is necessary to apply the plasticizer such as glycerine homogeneously from the inside and the outside. This may be carried out by the same apparatus and by spraying.

TABLE

| | | unit | | | | | |
|---|---|---|---|---|---|---|---|
| | Residual IPM after centrifuging | g | 1270 | 1270 | 1270 | 1270 | 1270 |
| | Consumption IPA | kg | 2000 | 1033 | 295 | 177 | 147 |
| Step 1 | IPM content Pass-through | ppm | 633 | 1224 | 4287 | 7131 | 8548 |
| Step 2 | IPM content Circulation | ppm | 10 | 230 | 817 | 1356 | 1630 |
| Step 3 | IPM content Circulation | ppm | | 10 | 226 | 741 | 1136 |
| Step 4 | IPM content Circulation | ppm | | | 10 | 251 | 664 |
| Step 5 | IPM content Circulation | ppm | | | | 10 | 221 |
| | IPM content | ppm | | | | | 10 |

Surprisingly, as is evident from the table, the consumption of solvent is drastically reduced when the process of the invention is employed. It should be pointed out that in the prior art (DD-A-224 343 and DD-A-219 804) the hollow filaments are first completely submerged in solvent and the solvent is then drained. The consumption of IPA is significantly higher than the consumption in the two-step process depicted in the table, to achieve the same membrane quality. If the same amounts of cleaning agent are used, the residual lumen filler in the hollow filaments is significantly higher.

A further subject of the invention is an apparatus for carrying out a process for the removal of a lumen filler and/or other soluble residues from hollow filament bundles by means of centrifuging and flushing with a solvent or cleaning agent, which apparatus is illustrated in more detail by FIGS. 1, 2, 3 and 4. Apart from the common means such as the means for introducing and draining the lumen filler and flushing agent as well as for the centrifuge operation, the apparatus contains an extractor basket 4 with receptacles 15 for radial insertion of the hollow filament bundles, spacers 16, and a distributor 7 with spray nozzles 8 for end spraying of the hollow filament bundles.

We claim:

1. Process for removal of at least one of a lumen filler and other soluble residues from hollow filaments of finite length which are combined into bundles, comprising first roughly removing the lumen filler by means of centrifuging, the bundles are cleaned by feeding a solvent and centrifuging, and the solvent is then evaporated by means of a gas, wherein the cleaning with solvent is carried out by end spraying of the hollow filament bundles in at least two steps, whereby the first step is carried out in a pass through mode and spraying in further steps is carried out in a recirculation process.

2. Process according to claim 1, wherein the spraying is carried out in at least three steps, whereby the first step is carried out in a pass-through mode and spraying in further steps is carried out in a recirculation process.

3. Process according to claim 1, wherein solvents containing lumen fillers and soluble residues are collected from each step separately, whereby the solvent of the first step is fed to the recovery process and the solvents of the further steps are used for spraying in a lower-order step.

4. Process according to claim 1, wherein the spraying of the hollow filament bundles takes place in up to eight steps, whereby the second and the subsequent steps are carried out under recirculation in such a way that the solvent applied is collected after the pass through the bundles and is redirected to the ends of the bundles until the content of lumen filler in the solvent remains approximately constant.

5. Process according to claim 1, wherein the last step is carried out under recirculation until a constant concentration of at most 400, preferably at most 250 or 200 ppm of lumen filler or soluble residues, respectively, has been attained.

6. Process according to claim 5, wherein in the last step fresh solvent containing at most 20 ppm of lumen filler is used.

7. Process according to claim 6, wherein in the last step solvents containing at most 5 ppm of lumen filler are used.

8. Process according to claim 1, wherein the hollow filament bundles are radially arranged in groups in the centrifuge.

9. Process according to claim 1, wherein the lumen filler and solvent are recovered from the solvent collected in the first step, which has a high content of lumen filler.

10. Process according to claim 1, wherein solvent 0.3 to 10 times the hollow filament volume is employed for the individual steps.

11. Process according to claim 10, wherein solvent 0.6 to 5 times the hollow filament volume is employed for the individual steps.

12. Apparatus for carrying out a process for removal of at least one of a lumen filler and other soluble residues from hollow filament bundles by means of centrifuging and flushing with a solvent or cleaning agent, comprising means for introducing and draining lumen filler and flushing agent as well as for operating the centrifuge, and common centrifuge accessories, an extractor basket with receptacles for radial insertion of hollow filament bundles, spacers and a distributor with spraying nozzles for end spraying of the hollow filament bundles.

* * * * *